United States Patent [19]

Kawai

[11] 4,074,144

[45] Feb. 14, 1978

[54] SWITCH DEVICE

[76] Inventor: Mitsuji Kawai, No. 26, 1-chome, Kaname-cho, Toshima, Tokyo, Japan

[21] Appl. No.: 686,019

[22] Filed: May 13, 1976

[51] Int. Cl.² .............................................. B60K 33/00

[52] U.S. Cl. .................................. 307/10 R; 200/86.5

[58] Field of Search ..................... 307/10 R, 112, 113, 307/114, 115, 149, 139; 200/86.5

[56] References Cited

U.S. PATENT DOCUMENTS 3,695,379 10/1972 Veilleux ............................ 307/10 R

*Primary Examiner*—Herman Hohauser

*Attorney, Agent, or Firm*—Irving M. Weiner; Pamela S. Austin

[57] ABSTRACT

A switch device in which two switch mechanisms are connected in series in an electric circuit which connects between a member to be operated and a power source. One of said switch mechanisms includes a stationary contact, a movable member having a movable contact mounted thereon for engaging and disengaging from said stationary contact and a permanent magnet attracted to or a spring applied against said movable member, said movable member being releasably connected to a slidable member connected to a vehicle accelerator pedal for movement with the slidable member in a portion of the movement of the slidable member. The other switch mechanism includes a stationary contact and a movable contact for making engagement with said stationary contact of the other switch mechanism and disengaging from the stationary contact by the slidable member.

10 Claims, 3 Drawing Figures

SWITCH DEVICE

BACKGROUND OF THE INVENTION

This invention relates to a switch device and more particularly, to improvements over the switch devices as disclosed in Japanese Utility Model Registration Nos. 843,881 and 979,805.

Any of the device disclosed in the above-mentioned Japanese utility model registrations comprises a slidable member adapted to move in response to the pivotal movement of an accelerator pedal by the application of a depressing-down force to the pedal or the release of the depressing-down force applied to the pedal to thereby operate a movable contact operation member to cause a movable contact to make engagement with or disengage from a cooperating stationary contact and after the slidable member has moved a predetermined amount to operate the movable pad operation member, the slidable member moves leaving the movable pad member inoperative with the movable contact maintained in engagement with or disengagement from the cooperating stationary contact. As soon as the depressing-down force applied to the accelerator pedal is removed from the pedal, the movable contact makes engagement with or disengages from the cooperating stationary contact.

Assuming that any of the switch devices of the above-mentioned Japanese utility model registrations is so designed that when the accelerator pedal is depressed down while the motor car in which the switch device is incorporated is running, the electrical contacts make engagement with each other and when the depressing-down force applied to the pedal is removed from the pedal, the electrical contacts separate from each other or alternatively, when the depressing-down force applied to the accelerator pedal is removed from the pedal, the electrical contacts make engagement with each other and when the depressing-down force is applied to the pedal, the electrical contacts separate from each other.

In some instances the switch devices of the above-mentioned Japanese utility model registrations are so designed that when the accelerator pedal is depressed-down, the electrical contacts of the switch device make engagement with each other to make the electric circuit from the power source to the electromagnet to supply electric current to the electromagnet to thereby retract the metering rod out of the main jet bore in the main jet control device incorporated in the carburetor of a motor car engine so as to increase the ratio of fuel in the fuel-air mixture within the engine whereby the motor car is accelerated. When the motor car has been accelerated to a desired speed, the depressing-down force applied to the accelerator pedal is released to separate the electrical contacts from each other whereupon the metering rod is advanced into the main jet bore to limit the flow of fuel to the engine, that is, the fuel ratio in the fuel-air mixture within the engine is decreased.

There is also the instance in which the switch devices are so designed that when the depressing-down force applied to the accelerator pedal is released, the electrical contacts make engagement with each other. In such a case, since the release of the depressing down force applied to the accelerator pedal is to decelerate the motor car, the closure of the electric circuit to the electromagnet through the engagement between the electrical contacts allows electric current to flow to the electromagnet to advance the metering rod so as to close the main jet bore whereby the flow of fuel to the engine is interrupted. Thus, in the latter case, waste of the fuel is prevented to decrease the environmental pollution accordingly.

Assuming that the brake pedal is depressed down either to accelerate or stop a motor car which is running at a deceleration, then, since the contacts are in engagement with each other and the main jet bore is closed to interrupt the flow of fuel to the engine at such at time as in the former instance, the engine tends to stop. Therefore, it is necessary to separate the contacts from each other and resume the flow of fuel to the engine. In order to accelerate the motor car, the accelerator pedal is depressed-down and the metering rod is retracted out of the main jet bore to open the main jet bore whereby the fuel is passed into the engine to operate the engine satisfactorily. However, when the motor car is stopped, since the accelerator pedal is not depressed-down, the contacts remain in their engaging position. In order to overcome the difficulties inherent in the conventional switch devices, it has been practiced that the brake pedal, clutch pedal and gear lever are provided with separate switches to operate the pedals separately to open the contacts associated with these switches, respectively. These separate switches are connected in series to each other and to any of the switch devices disclosed in the above-mentioned Japanese utility model registrations to thereby prevent the stoppage of the engine when the running motor car is stopped.

SUMMARY OF THE INVENTION

Therefore, one principal object of the present invention is to provide an improved switch device which can eliminate the necessity for provision of separate switches for the brake pedal, clutch pedal and gear lever, respectively and which is simpler than the conventional switch devices with respect to construction and operation.

According to the present invention, the switch device is so designed that not only when the accelerator pedal is depressed-down to accelerate the motor car, but also when the depressing-down force applied to the pedal is removed from the pedal to stop the running motor car, the contacts are opened to break the electric circuit leading to the contacts whereby the metering rod which is now closing the main jet bore in the main jet control device is retracted to open the main jet bore whereupon the fuel is supplied to the engine which then starts under inertia force. Thus, the switch device of the present invention eliminates the necessity of providing separate switches for the brake pedal, clutch pedal and gear lever and, the construction is substantially simplified.

The above and other objects, features and attendant advantages of the present invention will be more readily apparent to those skilled in the art from a reading of the following detailed description in conjunction with the accompanying drawings which show one preferred embodiment of a switch device of the present invention for illustration purposes only, but not for limiting the scope of the same in any way.

PREFERRED EMBODIMENT OF THE INVENTION

Figure 1:
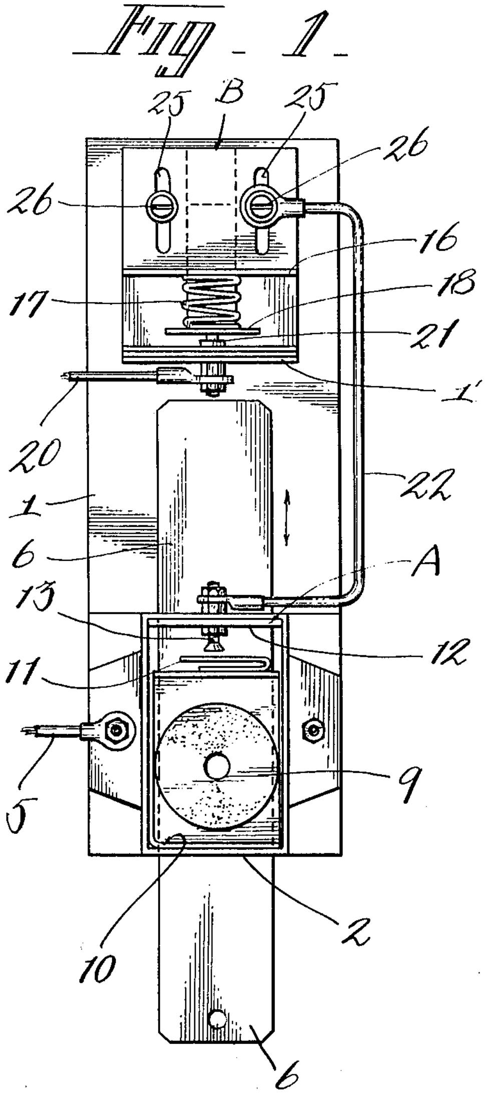
FIG. 1 is a front elevational view of an embodiment of the switch device.
Figure 2:
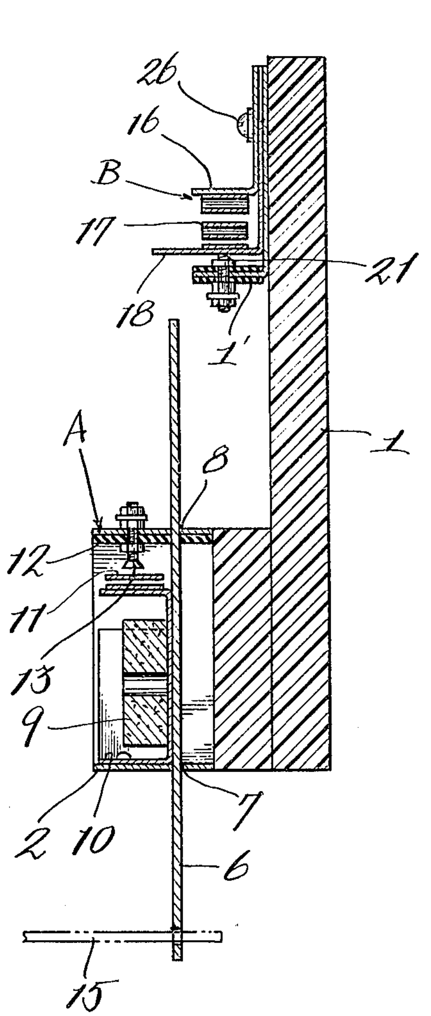
FIG. 2 is a side elevation view in vertical section of the switch device of FIG. 1.
Figure 3:
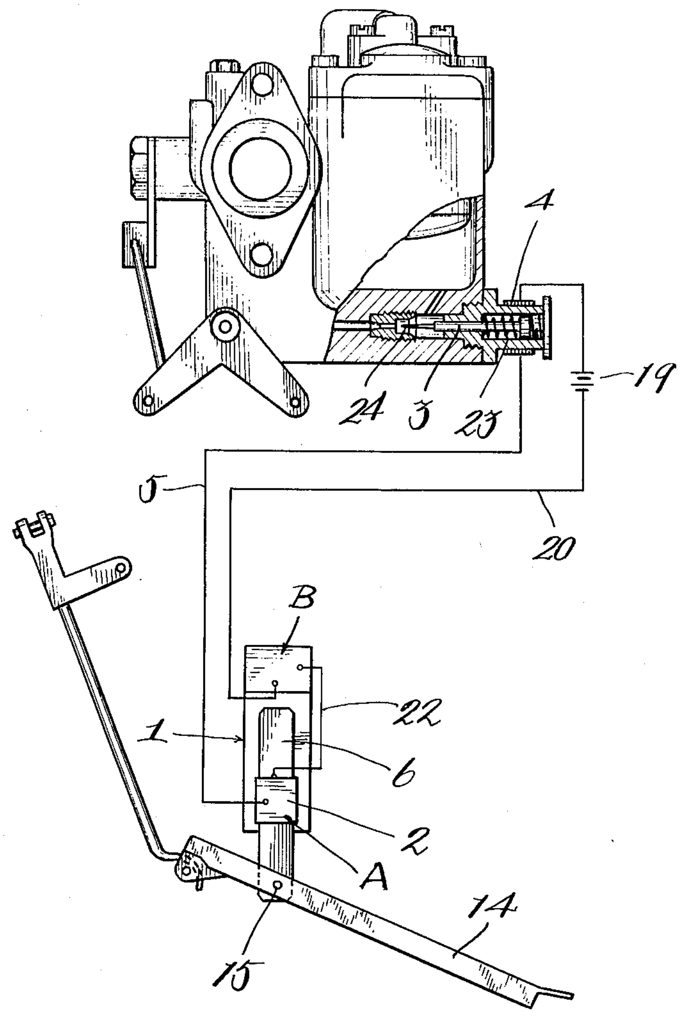
FIG. 3 is an explanatory view showing the operation of the switch device when employed in conjunction with a main jet control device incorporated in a vehicle engine carburetor.

The present invention will be now described referring to the accompanying drawings and more particularly, to FIGS. 1 and 2 thereof in which the preferred embodiment of the switch device of the invention is illustrated. In these Figures, reference numeral 1 shows a vertical mounting plate on which a pair of spaced lower and upper switch mechanisms A and B are mounted on one side of the plate at different heights along the mounting plate and connected in series in an electric circuit. The lower switch mechanism A is incorporated in a shielding framework 2 which is in turn fixedly secured to the lower end portion of the mounting plate 1 on the above-mentioned one side of the plate. A conductor 5 is electrically connected at one end to the shielding framework 2 and at the other end to an electromagnet 4 (FIG. 3) which is adapted to operate a metering rod 3 (FIG. 3). The electromagnet 4 and metering rod 3 are parts of a main jet control device incorporated in a carburetor for a motor car engine. A vertical slidable plate 6 formed of a magnetizable metal extends vertically through aligned lower and upper slits 7 and 8 formed in the lower and upper horizontal frame members of the framework 2 for slidable movement in a vertical plane (as shown by the double arrow line in FIG. 1).

A U-shaped cross-section movable frame 10 formed of a magnetizable metal is movably mounted on the lower horizontal frame member of the framework 2 and has a permanent magnet 9 attracted to one or the left side (as seen in FIG. 2) of the arm of the U-shaped cross section movable frame 10 whereby the movable frame 10 is attracted to the slidable metal plate 6 by means of the magnetic force of the magnet 9. A substantially U-shaped resilient contact piece 11 is secured to the top of the upper horizontal leg of the movable frame 10 and a cooperating stationary contact 13 is fixedly secured to the upper horizontal frame member of the framework 2 with an electrically insulating plate 12 interposed therebetween and extends through the frame member and insulating plate with the lower end of the contact 13 positioned in such a position to be engaged by and disengaged from the movable contact piece 11 on the movable frame 10 when the frame 10 is moved upwardly and downwardly as the slidable plate 6 moves in the vertical plane as shown by the double arrow in FIG. 1. The slidable plate 6 and movable frame 10 are so arranged that after the resilient contact piece 11 on the movable frame 10 has made engagement with the stationary contact 13 on the framework 2 as the slidable plate 6 moves upwardly carrying the movable frame 10 therewith, only the slidable plate 6 is allowed to move upwardly to its predetermined upper dead of the upward stroke of its movement leaving the movable frame 10 behind the slidable plate 6.

As more clearly shown in FIG. 3, the lower end of the slidable plate 6 is connected to an accelerator pedal 14 in an intermediate position between the opposite ends of the pedal by means of a pin 15 so that the pedal may pivot about the pin 15 relative to the slidable plate 6 and the upper end of the slidable plate 6 is adapted to engage and disengage from a L-shaped resilient contact piece 18 (FIGS. 1 and 2) of the upper switch mechanism B. The longer or vertical leg of the L-shaped resilient contact piece 18 abuts against the above-mentioned side of the mounting plate 1 so that the position of the contact piece 18 may be adjusted relative to the plate 6 in a manner as will be described hereinafter and the longer or vertical leg of a stationary switch plate 16 having an L-shape is adjustably secured to the same side of the mounting plate 1 in a manner as will be described hereinafter with the shorter or horizontal legs of the resilient contact piece and switch plate extending parallel to each other and spaced from each other. A leaf spring 17 extends between the shorter legs of the contact piece 18 and switch plate 16 and anchored at the opposite ends to the contact piece and switch plate. The longer or vertical leg of an L-shaped support bracket 1' abuts against the above-mentioned side of the mounting plate 1 so that the position of the bracket 1' may be adjusted in a manner as will be described hereinafter and the shorter or horizontal leg of the support bracket is positioned below the horizontal leg of the resilient contact piece 18. A stationary piece 21 is mounted on the shorter or horizontal leg of the support bracket 1' and the biasing force of the leaf spring 17 normally urges the resilient contact piece 18 to make engagement with the stationary contact piece 21. The resilient contact piece 18 is separated from the stationary contact piece 21 against the biasing force of the leaf spring 17 when the upper end of the slidable plate 6 contacts and moves the lower contact piece 18 upwardly as the slidable plate moves in its upstroke movement. The stationary contact piece 21 is connected to the permanent magnet 9 by means of a conductor 20 which leads to a suitable power source 19. The switch plate 16 is connected through a conductor 22 to the stationary contact piece 13 of the lower switch mechanism A.

In operation, the accelerator pedal 14 is held in its depressed down position in order to accelerate the motor car having the carburetor provided with the main jet control device (see FIG. 3) with which the switch device of the invention is employed. The slidable plate 6 is then separated from the resilient contact piece 18 and accordingly, the resilient contact piece 11 on the movable frame 10 is separated from the stationary contact 13 as shown in FIGS. 1 and 2 whereby the flow of electric current to the electromagnet 4 from the power source 19 is interrupted and the metering rod 3 is retracted or moved rightward in the main jet bore 24 as seen in FIG. 3 under the biasing force of a spring 23 on the metering rod 3 to open the main jet bore 24 resulting in supply of a sufficient amount of fuel to the motor car engine (not shown).

Thereafter, when the depressing down force applied to the accelerator pedal 4 is reduced, the pedal is allowed to pivot upwardly about the pin 15 and accordingly, the slidable plate 6 moves upwardly carrying the magnet support frame 10 therewith until the resilient contact piece 11 on the movable frame 10 makes engagement with the stationary contact 13 whereupon the flow of electric current to the electromagnet 4 from the power source 19 is resumed and the metering rod 3 advances or moves leftward in the main jet bore 24 as seen in FIG. 3 to close the main jet bore 24.

Thereafter, when the depressing-down force is completely removed from the accelerator pedal 4, the pedal further pivots upwardly about the pin 15 and accordingly, the slidable plate 6 also further moves upwardly leaving the movable frame 10 behind the plate with the movable contact piece 11 in engagement with the stationary contact 13 until the upper end of the slidable plate 6 makes engagement with the resilient contact piece 18 of the switch mechanism B to separate the contact piece from the stationary contact 21 which is now in engagement with the resilient contact piece 18. Therefore, the resilient contact piece 13 is maintained in engagement with the stationary contact 11 in the switch mechanism A, the flow of electric current to the electromagnet 4 from the power source 19 is interrupted and the main jet bore 24 is left open whereby fuel is suplied to the engine to start the engine under inertia force. And with the switch device maintained in this state, when the accelerator pedal 4 is depressed down, the resilient contact piece 18 immediately makes engagement with the stationary contact 21 in the switch mechanism B, but the resilient contact piece 11 disengages from the stationary contact 13 in the switch mechanism A whereby the main jet bore is left open. As a result, fuel can be supplied to the engine and the motor car can be accelerated without difficulty. The switch plate 16 is provided with two parallel slots 25 for receiving the adjusting screws 26 so that the position of the entire switch mechanism B relative to the slidable plate 6 can be adjusted to thereby adjust the distance between the resilient contact piece 18 and slidable plate 6 and the positions of the components of the switch mechanism B can be also adjusted relative to each other. More particularly, the mounting plate 1 is provided with a plurality of threaded bores (not shown) to selectively receive the adjusting screws 26 which adjustably hold the longer legs of the support bracket 1', switch plate 16 and resilient contact piece 18 against the mounting plate 1. Although the permanent magnet 9 is employed for operating the movable frame 10 in the illustrated embodiment, alternatively the coil spring may be equally provided in abutment against the slidable plate for operating the movable frame as shown in the above-mentioned Japanese Utility Model Reg. No. 979,805.

With the above construction and arrangement of the parts of the switch device of the present invention, the switch can conveniently perform other various functions as well as the switching function referred to hereinabove and substantially improves the switch devices disclosed in the above-mentioned Japanese utility model registrations.

Features and advantages other than those enumerated will readily occur to those skilled in the art, as will many modifications and alterations in the preferred embodiment disclosed, all of which may be achieved without departure from the spirit and scope of the invention.

What is claimed is:

1. A switch device comprising:

two switch mechanisms connected in series in an electric circuit extending between a member to be operated and a power source;

one of said two switch mechanisms including a stationary contact and a movable member having a movable contact, said movable contact being adapted to engage and disengage from said stationary contact;

a magnet attracted to or a spring applied against said movable member;

said movable member being in releasable engagement with a slidable member connected to a vehicle accelerator by means of said magnet or spring; and the other switch mechanism including a stationary contact and a movable contact for engaging and disengaging from said stationary contact of said other switch mechanism by the slidable movement of said slidable member.

2. A switch device for use in connection with a main jet control device incorporated in a vehicle engine carburetor and having a metering rod, said switch device comprising two switch mechanisms connected in an electric circuit extending between said metering rod and a power source and a slidable member extending through one of said switch mechanisms and connected to the accelerator pedal to be operated by said pedal, said one switch mechanism including a stationary contact, a movable contact for engaging and disengaging from said stationary contact as said slidable member moves together with and independently of said movable member and a permanent magnet attracted to said movable member to releasably connect the movable member to said slidable member so that the movable member moves together with the slidable member by a predetermined distance of the movement of the slidable member; and the other switch member including a stationary contact and a movable contact for engaging and disengaging from said stationary contact as the slidable member moves.

3. The switch device as set forth in claim 2, in which said permanent magnet is electrically connected to said metering rod through a conductor and an electromagnet.

4. The switch device as set forth in claim 2, in which said one switch mechanism comprises a movable frame incorporated in a framework secured to the lower end portion of a mounting plate and said movable contact of the one switch mechanism comprises a resilient contact piece secured to the top of said movable frame.

5. The switch device as set forth in claim 2, in which said stationary contact of the one switch mechanism is fixedly secured to said framework above said movable contact of the one switch mechanism in opposition to the movable contact.

6. The switch device as set forth in claim 2, in which said slidable member comprises a slidable plate which loosely extends through slits in said framework and is adapted to make arrangement with said movable contact of the other switch mechanism when the slidable plate moves beyond said predetermined distance.

7. The switch device as set forth in claim 2, in which said other switch mechanism is adjustably secured to the upper end portion of said mounting plate spaced aboce said one switch mechanism so that the distance between said movable contact of the other switch mechanism and said slidable plate is adjustable.

8. The switch device as set forth in claim 2, in which said other switch mechanism further includes a switch plate positioned above said movable contact of the other switch mechanism and a leaf spring extending between and anchored at the opposite ends to said stationary and movable contacts of the other switch mechanism to normally urge the movable contact to make engagement with the stationary contact.

9. The switch device as set forth in claim 2, in which said switch late has slots for receiving adjusting screws so that the position of said other switch mechanism to said slidable member is adjusted.

10. The switch device as set forth in claim 4, wherein:

said stationary contact of the one switch mechanism is fixedly secured to said framework above said movable contact of the one switch mechanism in opposition to the movable contact; and said slidable member comprises a slidable plate which loosely extends through slits in said framework and is adapted to make engagement with said movable contact of the other switch mechanism when the slidable plate moves beyond said predetermined distance.

* * * * *